United States Patent

Takagishi et al.

[11] Patent Number: 6,125,018
[45] Date of Patent: *Sep. 26, 2000

[54] COMPOSITE TYPE THIN-FILM MAGNETIC HEAD

[75] Inventors: Masayuki Takagishi; Shin-ichi Akoh; Daisuke Iitsuka, all of Mishima-gun, Japan

[73] Assignee: Read-Rite SMI Corporation, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/094,446

[22] Filed: Jun. 10, 1998

[30] Foreign Application Priority Data

Jun. 10, 1997 [JP] Japan .................................. 9-169516

[51] Int. Cl.$^7$ .............................. G11B 5/39; G11B 5/147; G11B 5/187
[52] U.S. Cl. ......................... 360/317; 360/122; 360/126
[58] Field of Search ................................. 360/113, 119, 360/120, 122, 125, 126, 317

[56] References Cited

U.S. PATENT DOCUMENTS

| | | | |
|---|---|---|---|
| 4,970,616 | 11/1990 | Ramaswamy | 360/122 |
| 5,267,112 | 11/1993 | Batra et al. | 360/119 |
| 5,283,942 | 2/1994 | Chen et al. | 29/603.18 |
| 5,349,745 | 9/1994 | Kawabe et al. | 29/603.18 |
| 5,479,696 | 1/1996 | McNeil | 29/603.2 |
| 5,719,730 | 2/1998 | Chang et al. | 360/113 |
| 5,801,910 | 9/1998 | Mallary | 360/126 |
| 5,843,521 | 12/1998 | Ju et al. | 427/129 |

*Primary Examiner*—William Klimowicz
*Attorney, Agent, or Firm*—Blakely Sokoloff Taylor & Zafman, LLP

[57] ABSTRACT

A composite type thin-film magnetic head. In one embodiment, a projection is formed on a second magnetic film layer of a composite type thin-film magnetic head. The position where this projection is formed is the area where a second magnetic film layer and third magnetic film layer face each other across a gap film layer. A width b of the projection is smaller than a width a of the third magnetic layer film.

8 Claims, 11 Drawing Sheets

IDEAL MAGNETIZATION PATTERN

FIG. 13A

RANGE IN WHICH OUTPUT WAVEFORM APPEARS

WRITING WIDTH

FIG. 13B

ACTUAL MAGNETIZATION PATTERN

FIG. 14A
(PRIOR ART)

RANGE IN WHICH OUTPUT WAVEFORM APPEARS

ERASE WIDTH

WRITING WIDTH

COMPOSITE TYPE THIN-FILM MAGNETIC HEAD

BACKGROUND OF THE INVENTION

1. Field of the Invention

The present invention concerns an MR-inductive composite type thin-film magnetic head which is integrally equipped with an inductive head used for recording and a magneto-resistive head (MR head) used for playback.

2. Background Information

Devices such as computers and word processors, etc., have become widespread in Japanese industry, and magnetic memory devices contained in such devices have continued to increase in capacity. As the capacity of magnetic memory devices has increased, there has been a demand for improved recording-playback performance in thin-film magnetic heads.

Under such conditions, composite type thin-film magnetic heads which are integrally equipped with an inductive head used for recording and a magneto-resistive head (MR head) have been proposed instead of conventional inductive heads.

Figure 11:
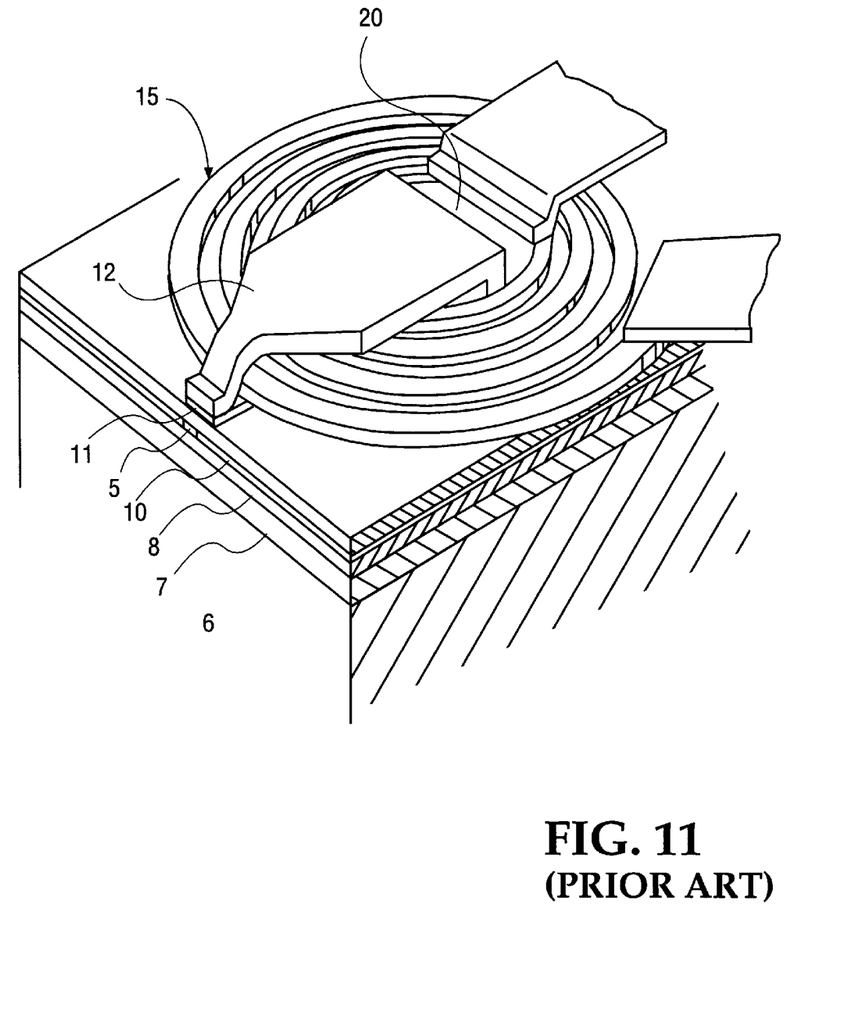
FIG. 11 is a perspective view which illustrates the internal structure of a common composite type thin-film magnetic head.
Figure 12:
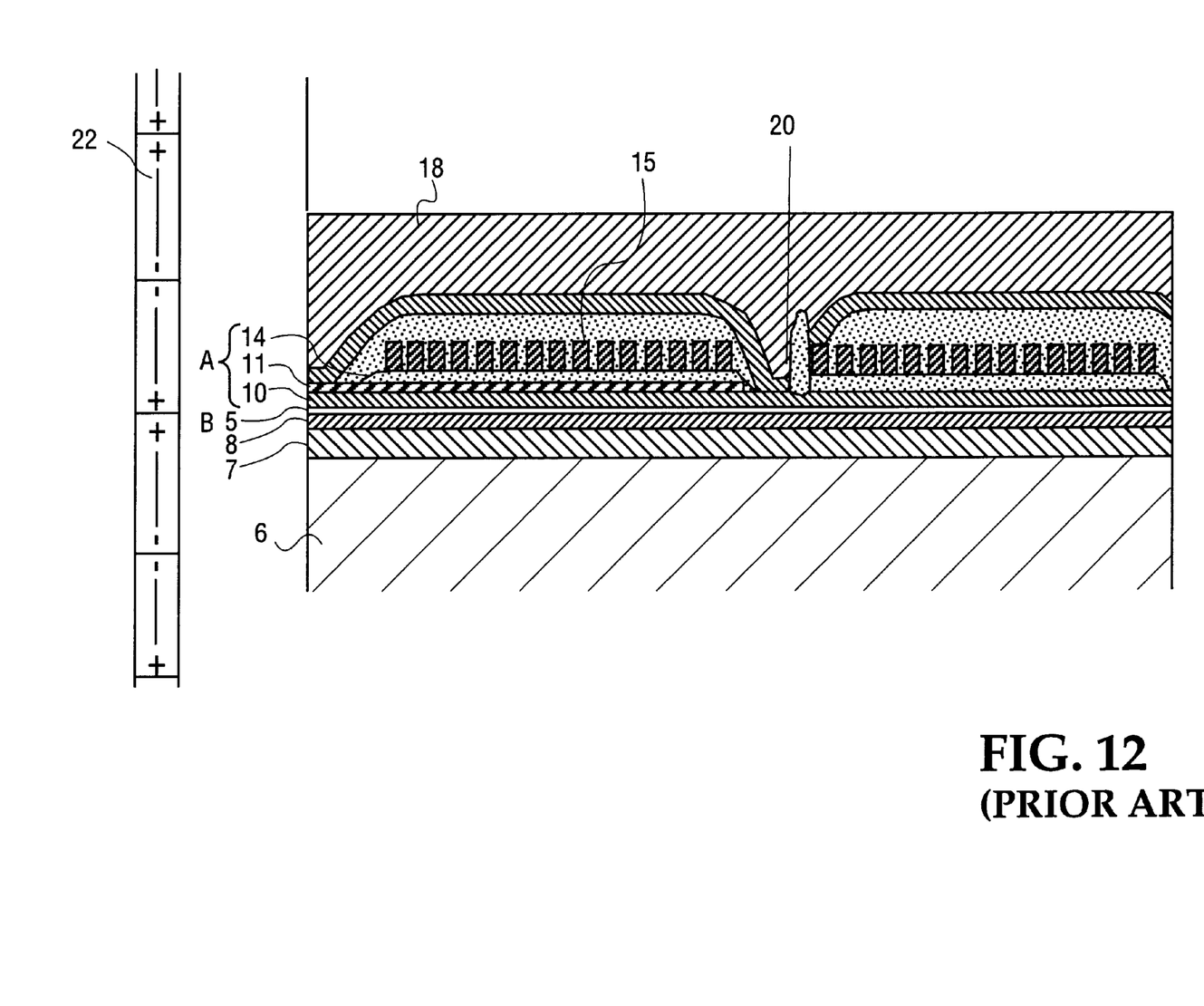
FIG. 12 is a sectional view of a common composite type thin-film magnetic head.

The layer construction of a composite type thin-film magnetic head is as shown in FIGS. 11 and 12. In such a head, an inductive head used for recording and a magneto-resistive head used for playback are integrally laminated.

Specifically, in a composite type thin-film magnetic head, an inductive head used for recording is formed by the upper-side portion in the figures (i. e., the portion indicated by bracket A in FIG. 12). Furthermore, a magneto-resistive element 5 is contained in the layers beneath this inductive head, so that a magneto-resistive head B is formed by this portion.

The respective layers will be concretely described below.

In a composite type thin-film magnetic head, a substrate 6 consisting of an $Al_2O_3$-TiC ceramic, etc., is used as a base, and an insulating film 7 consisting of $Al_2O_3$ is formed on this substrate 6. Furthermore, a first magnetic film layer 8 is laminated on the surface of the insulating film 7. Moreover, this first magnetic film layer 8 is referred to as the "lower shielding magnetic film." In addition, the magneto-resistive element 5 is embedded in this first magnetic film layer 8.

The magneto-resistive element 5 is a member which has a type of electro-magnetic effect such that when the material is magnetized, the electrical resistance of the material changes. Materials which have such a magneto-resistive effect include NiFeE, NiFeCo, NiCo, FeMn, $Fe_3O_4$, CoPt/Cr and Fe/Cr, etc. The material used for the magneto-resistive element 5 is appropriately selected from these materials.

A second magnetic film layer 10 is formed on top of the magneto-resistive element 5. This second magnetic film layer 10 is laminated over substantially the entire surface area of the substrate 6. Furthermore, this second magnetic film layer 10 is also referred to as the "upper shielding magnetic film."

Moreover, a magnetic gap film layer 11 is formed on the surface of the second magnetic film layer 10, and a third magnetic film layer 12 is laminated so that this magnetic gap film layer 11 is sandwiched between the third magnetic film layer 12 and the second magnetic film layer 10. Furthermore, this third magnetic film layer 12 is also referred to as the "recording inductive magnetic film layer" 12.

A protective layer 18 is disposed on top of the third magnetic film layer 12.

The plan-view shapes of the magnetic gap film layer 11 and third magnetic film layer 12 are as shown in FIG. 11. These layers are formed so that the tip end portions (where the magnetic gap is formed) are narrow, while the inside portions of the layers have a somewhat larger area. Furthermore, in the inside portions of the composite type thin-film magnetic head, as is shown in FIGS. 11 and 12, the third magnetic film layer 12 is in a positional relationship which is such that the third magnetic film layer 12 is separated from the second magnetic film layer 10 and magnetic gap layer 11, and an insulating film 14, conductive coil film 15 and insulating film 16 are interposed between the second magnetic film layer 10 and third magnetic film layer 12. Furthermore, the second magnetic film layer 10 and third magnetic film layer 12 are joined in the area of the rear gap 20 located toward the rear, and the conductive coil film 15 is disposed in the form of a coil centered on the rear gap 20 as shown in FIG. 11.

Meanwhile, the front end portions of the second magnetic film layer 10 and third magnetic film layer 12 face each other across the magnetic gap film layer 11, thus forming a magnetic gap in this area.

In this composite type thin-film magnetic head, during recording, a signal current is applied to the conductive coil film 15, so that magnetic flux is generated in the magnetic gap at the tip end where the third magnetic film layer 12 and second magnetic film layer 10 face each other. Accordingly, the signal is written on the magnetic medium 22.

During playback, magnetic flux from the magnetic medium 22 passes between the first magnetic film layer 8 and the second magnetic film layer 10 with the same timing that the magnetization transition regions on the magnetic medium 22 pass through. Accordingly, the resistance of the magneto-resistive element 5 which is located between the first magnetic film layer 8 and second magnetic film layer 10 varies so that a playback signal is output.

In magnetic recording, a magnetic medium material such as a magnetic disk, etc., is magnetized, and the residual magnetization remaining in this magnetic disk, etc., is utilized for recording. Accordingly, it is desirable that a sufficient magnetic flux be produced across the entire track width in the magnetized portions.

Figure 13A:
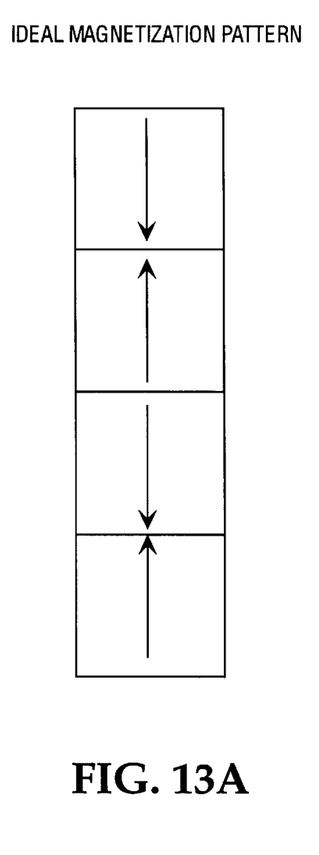
FIGS. 13A–B are explanatory diagrams which illustrate the ideal magnetization pattern of a magnetic material.
Figure 13B:
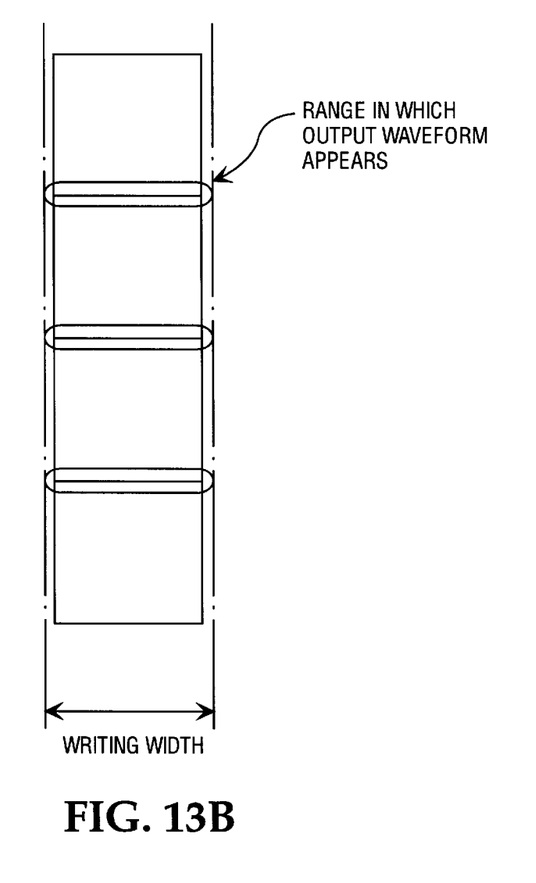

Specifically, it is desirable that the magnetic medium be uniformly magnetized in the direction of track width as shown in FIG. 1 3A, and that an output waveform be readable from the entire writing width as shown in FIG. 13B.

Figure 14A:
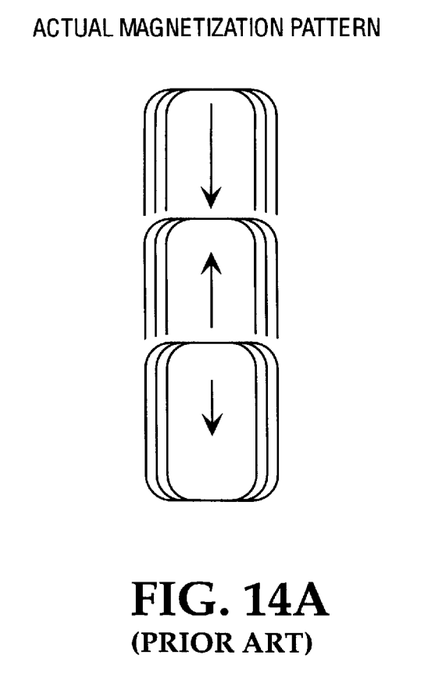
FIGS. 14A–B are explanatory diagrams which illustrate the actual magnetization pattern of a magnetic material.
Figure 14B:
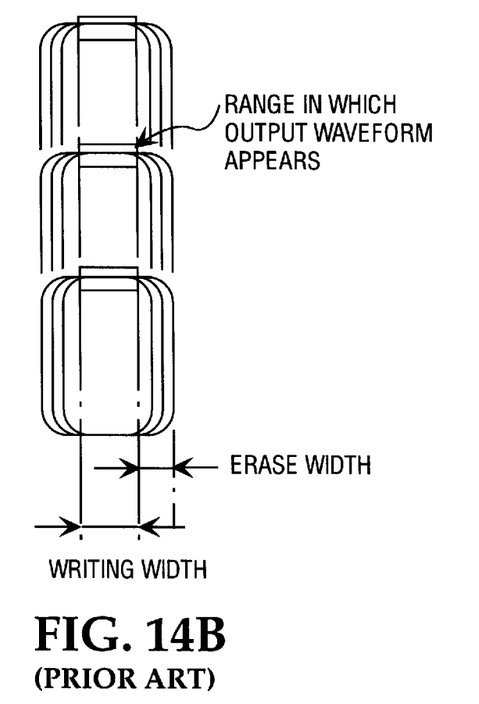

In actuality, however, the intensity of the magnetic field output by the recording head is weak at both edges of the track width, and there are also effects of leakage magnetic flux. Accordingly, the residual magnetization at the edges of the track width is weak as shown in FIG. 14A. As a result, as is shown in FIG. 14B, it is currently impossible to read the output waveform at both edges of the track width. Specifically, portions known as the "erase width," in which an output waveform is not produced, are formed at both edges of the writing width.

In other words, the erase width portions are regions in which no output waveform is produced, and are dead zones with respect to magnetic recording. Accordingly, in cases where the erase width is large, there is a corresponding drop in the ability to achieve a high recording density (high TIP). This is a major factor hindering the achievement of a high track density.

In addition, in the case of conventional composite type thin-film magnetic heads, the shape of the magnetization transition regions is oval, and the problem of a high noise level arises. Specifically, in the case of conventional composite type thin-film magnetic heads, the shape of the magnetization transition regions is not rectangular, but is close to "U" shaped. The cause of this will be explained below.

Figure 15:
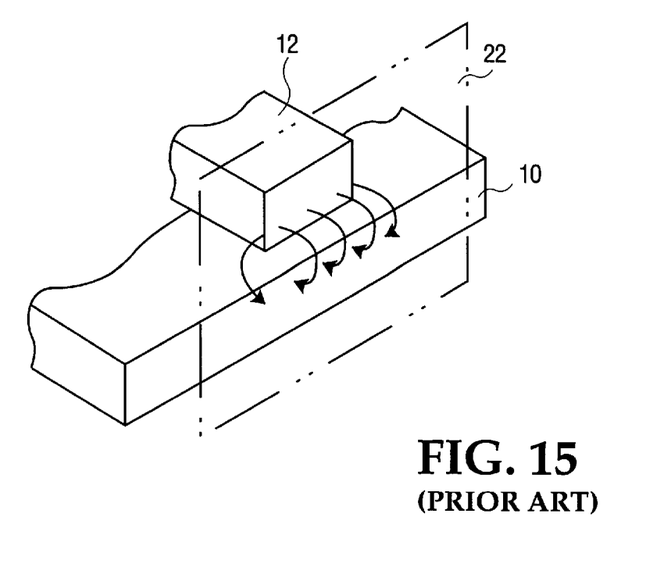
FIG. 15 is an explanatory diagram which shows the orientation of the magnetic flux in the vicinity of the magnetic gap of a conventional thin-film magnetic head in model form.
Figure 16A:
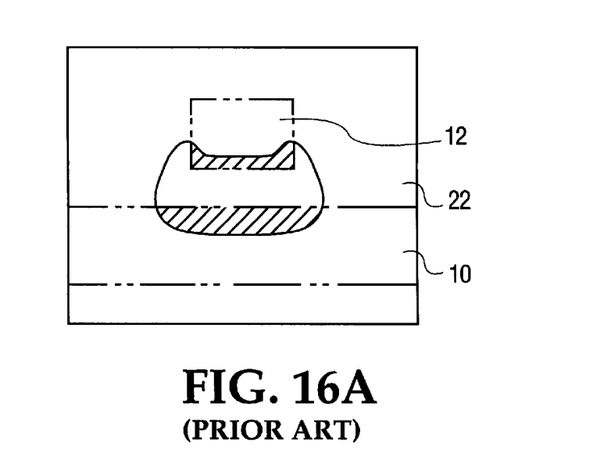
FIGS. 16A–C are explanatory diagrams which show the shape of the magnetic field above and below the gap of a conventional thin-film magnetic head, and the magnetization transition regions, in model form.
Figure 16B:
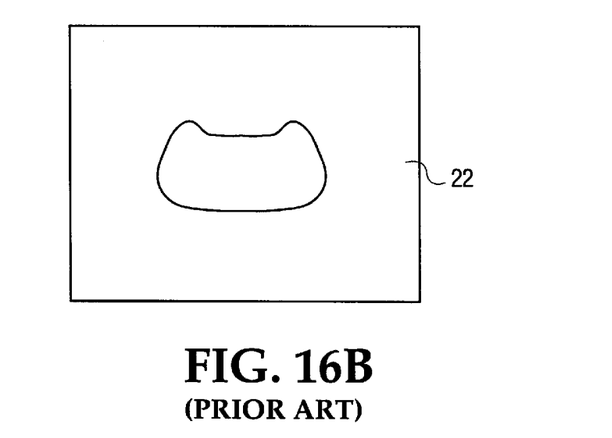
Figure 16C:
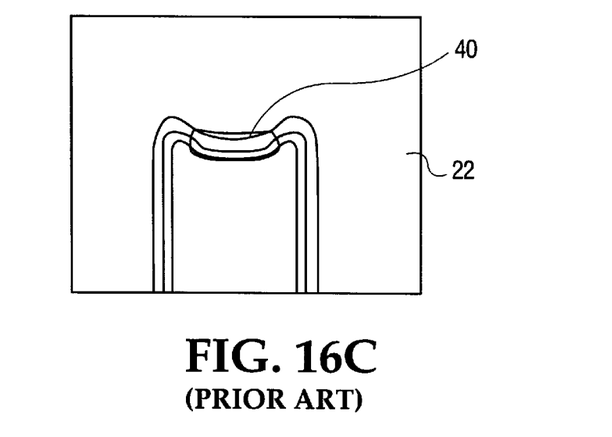

FIG. 15 is an explanatory diagram which shows the orientation of the magnetic flux in the vicinity of the magnetic gap of a conventional thin-film magnetic head in model form. FIGS. 16A–C are explanatory diagrams which show the shape of the magnetic field above and below the gap of a conventional thin-film magnetic head, and the magnetization transition regions, in model form. FIG. 16A shows the shape of the magnetic field above and below the gap of the thin-film magnetic head. The area surrounded by a frame is the range in which the coercive force Hc of the magnetic medium 22 is exceeded. Furthermore, FIG. 16B shows the shape of the magnetic field of the magnetic medium 22 in the initial stage of magnetization, and FIG. 16C shows a magnetization transition region on the magnetic medium 22.

In the magnetic gap area, magnetic flux emerges in a direction substantially perpendicular to the magnetic medium 22 at the end surfaces of the magnetic film layers (ABS surface side of the slider), as is indicated by the arrows in the central portion of FIG. 15. However, as is shown by the arrows at both ends in FIG. 15, magnetic flux emerges in a direction parallel to the gap from the areas in the vicinity of both end portions of the third magnetic film layer. As a result, the shape of the magnetic field in the vicinity of gap is a shape such as that shown in FIG. 16A, so that the magnetic field in the vicinity of the third magnetic film layer has a "U" shape in which both ends are slightly raised.

In the initial stage of magnetization, the magnetic medium 22 is magnetized as shown in FIG. 16B. Ultimately, however, since the magnetization transition regions which remain on the surface of the magnetic medium 22 are determined by the shape of the magnetic field in the upper portion of the gap as shown in FIG. 16C, the magnetization transition regions 40 assume a shape in which both ends are raised as shown in the figures. Furthermore, this edge shape increases the playback pulse width so that the resolution is caused to deteriorate. Moreover, since this edge shape is a source of noise, there are also problems in terms of a poor signal-to-noise ratio, etc. Such problems are an obstacle to any increase in the recording density.

Accordingly, noting the above-mentioned problems, the object of the present invention is to develop a composite type thin-film magnetic head which makes it possible to reduce the erase width and improve the shape of the magnetization transition regions, so that a high recording density can be realized.

SUMMARY OF THE INVENTION

A composite type thin-film magnetic head is described. In one embodiment the composite type thin-film magnetic head includes a first magnetic film layer, a second magnetic film layer and a third magnetic film layer. A magneto-restrictive element is interposed between the first magnetic film layer and the second magnetic film layer such that a magneto-restrictive head used for playback is constructed. End portions of the second magnetic film layer and third magnetic film layer face each other across a gap film layer such that an inductive head used for recording is constructed. A step-form projection is formed in a portion of the second magnetic film layer that faces the third magnetic film layer. A width of a facing portion of the projection is smaller than a width of a facing portion of the third magnetic film layer.

EXPLANATION OF SYMBOLS

1 Composite type thin-film magnetic head
5 Magneto-resistive element

6 Substrate
7 Insulating film
8 First magnetic film layer
11 Gap film layer
12 Third magnetic film layer
18 Protective layer
30 Second magnetic film layer
31 Projection.

DETAILED DESCRIPTION

In one embodiment, a composite type thin-film magnetic head is described which is used in order to solve the above-mentioned problems. In one embodiment, a composite type thin-film magnetic head of the present invention is characterized by the fact that in a composite type thin-film magnetic head [a] which has a first magnetic film layer, a second magnetic film layer and a third magnetic film layer, [b] in which a magneto-restrictive element is interposed between the aforementioned first magnetic film layer and second magnetic film layer so that a magneto-restrictive head used for playback is constructed, and [c] in which the end portions of the aforementioned second magnetic film layer and third magnetic film layer are caused to face each other across a gap film layer so that an inductive head used for recording is constructed, a step-form projection is formed in the portion of the aforementioned second magnetic film layer that faces the third magnetic film layer, and the width of the facing portion of said projection is smaller than the width of the facing portion of the third magnetic film layer.

In one embodiment, the composite type thin-film magnetic head of the present invention includes a step-form projection is disposed on the portion of the second magnetic film layer that faces the third magnetic film layer, and a magnetic gap is formed in the area of this projection.

Figure 3A:
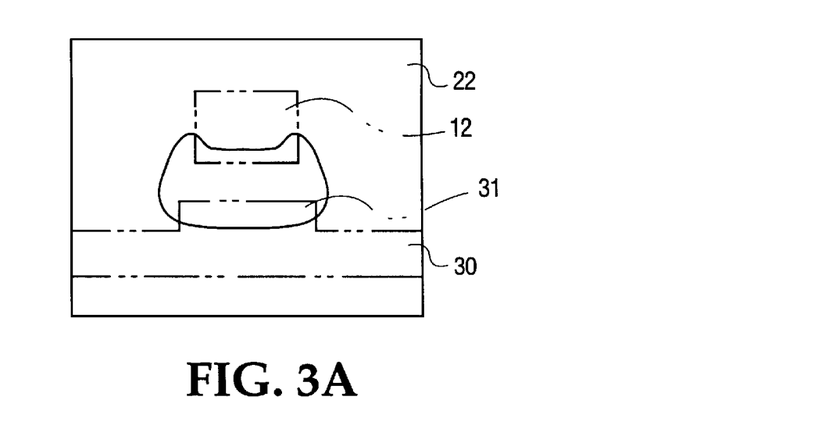
FIGS. 3A–C are explanatory diagrams which show (in model form) the shape of the magnetic field above and below the gap of the thin-film magnetic head in a case where the width of the projection of the second magnetic film layer and the width of the third magnetic film layer differ.

In one embodiment of the present invention, furthermore, the relationship between the width b of the projection and the width a of the facing portion of the third magnetic film layer is such that a>b. Specifically, even in cases where a projection is formed, the resulting transition region shape will rise at both edges in the same manner as in the prior art as shown in FIG. 3A if the width a of the facing portion of the third magnetic film layer is smaller than the width b of the projection. Furthermore, in cases where the width a of the facing portion of the third magnetic film layer is equal to the width b of the projection, the rise at both edges is alleviated compared to the case described above. However, as is shown in FIG. 3B, both edge portions still rise.

Figure 3B:
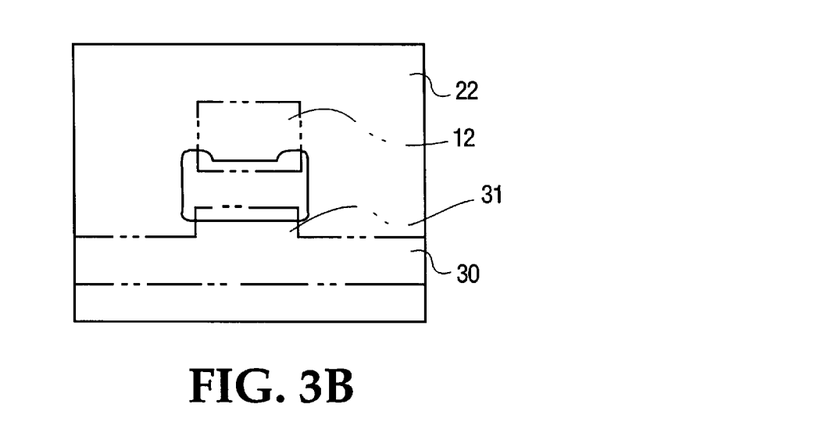
Figure 3C:
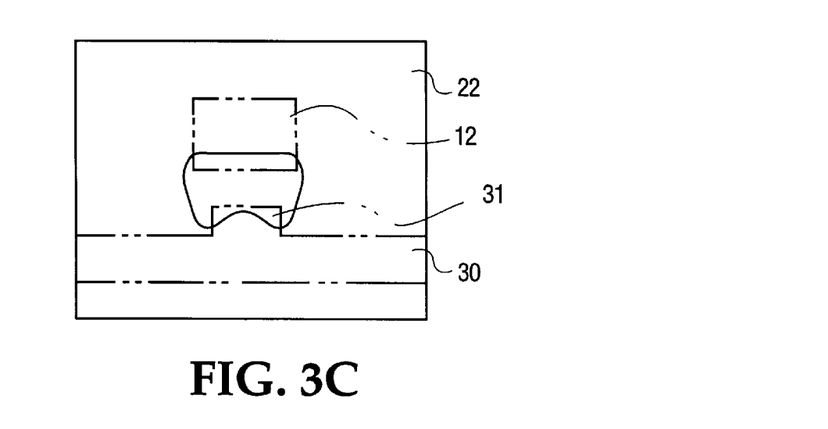

On the other hand, in cases where the width a of the facing portion of the third magnetic film layer is made larger than the width b of the projection, the magnetic flux at both edges of the gap emerges downward from the third magnetic film layer as shown in FIG. 3C, so that the transition region shape is improved to a rectangular shape.

These results depend on the shape in the vicinity of the gap. Specifically, in cases where the width b of the portion of the projection that faces the third magnetic film layer is smaller than the width a of the facing portion of the third magnetic film layer, the magnetization transition regions show a favorable shape.

Furthermore, in cases where a>b, as is shown in FIGS. 3A–C, the magnetic flux at the sides of the gap emerges downward from the third magnetic film layer, which determines the width of the magnetization transition regions. Accordingly, the leakage magnetic flux which spreads beyond this width is much smaller than in cases where a<b or cases where a=b. As a result, the erase width which constitutes a dead zone is reduced so that a high track pitch can be realized.

Furthermore, in one embodiment of the composite type thin-film head of the present invention, the portions of the second magnetic film layer other than the projection may be formed with a large width as in conventional heads. Accordingly, the second magnetic film layer also has a high degree of function as a magnetic shield on the side of the magneto-resistive head used for playback.

In another embodiment, the composite type thin-film magnetic head of the present invention is characterized by the fact that the height of the projection is 1.4 to 5 times the length of the writing gap.

Furthermore, in one embodiment, the composite type thin-film magnetic head of the present invention is characterized by the fact that the height of the projection is 0.5 to 2 microns.

Furthermore, in another embodiment, the composite type thin-film magnetic head of the present invention is characterized by the fact that the difference between the width of the projection on the second magnetic film layer and the width of the facing portion of the third magnetic film layer is 0.05 microns or greater.

Furthermore, in yet another embodiment, the composite type thin-film magnetic head of the present invention is characterized by the fact that the difference between the width of the projection on the second magnetic film layer and the width of the facing portion of the third magnetic film layer is 0.05 microns to 0.8 microns.

Furthermore, in still another embodiment, the composite type thin-film magnetic head of the present invention is characterized by the fact that the difference between the width of the projection on the second magnetic film layer and the width of the facing portion of the third magnetic film layer is 0.2 microns to 0.8 microns.

In addition, one embodiment of the composite type thin-film magnetic head of the present invention is characterized by the fact that the second magnetic film layer is formed by laminating a main body magnetic film layer, a non-magnetic film layer and a projection part layer, and the projection part layer is disposed on the main body magnetic film layer with the non-magnetic film layer interposed between said projection part layer and main body magnetic film layer.

In addition, another embodiment of the composite type thin-film magnetic head of the present invention is characterized by the fact that an inclined portion with an angle of 30° or less is formed on the corner portion of the portion of the third magnetic film layer that faces the second magnetic film layer.

Working configurations of the present invention will be further described below.

Figure 1:
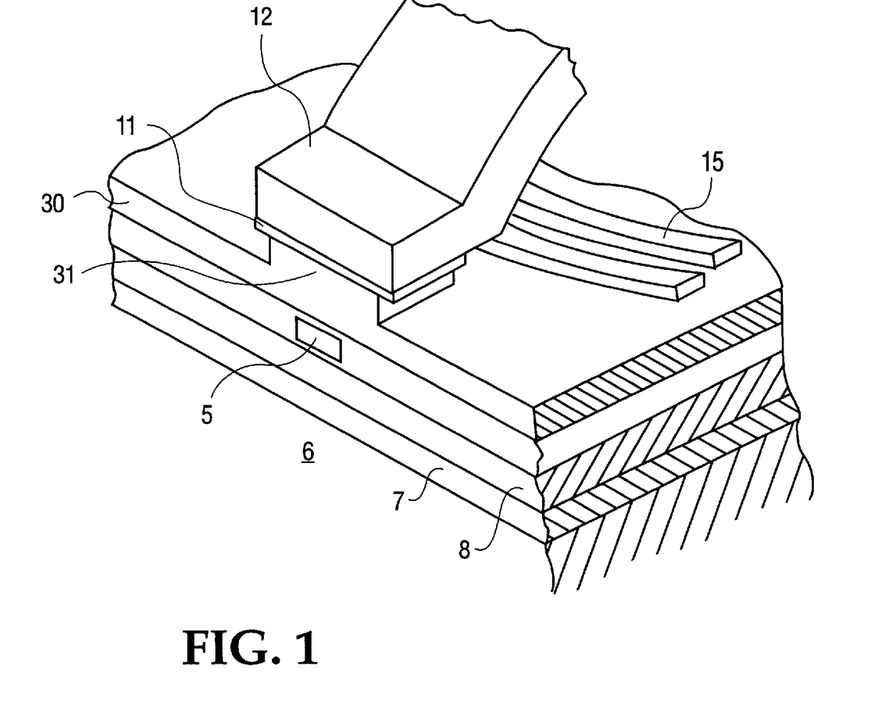
FIG. 1 is a perspective view of the gap portion of a composite time thin-film magnetic head which constitutes a working configuration of the present invention.
Figure 2:
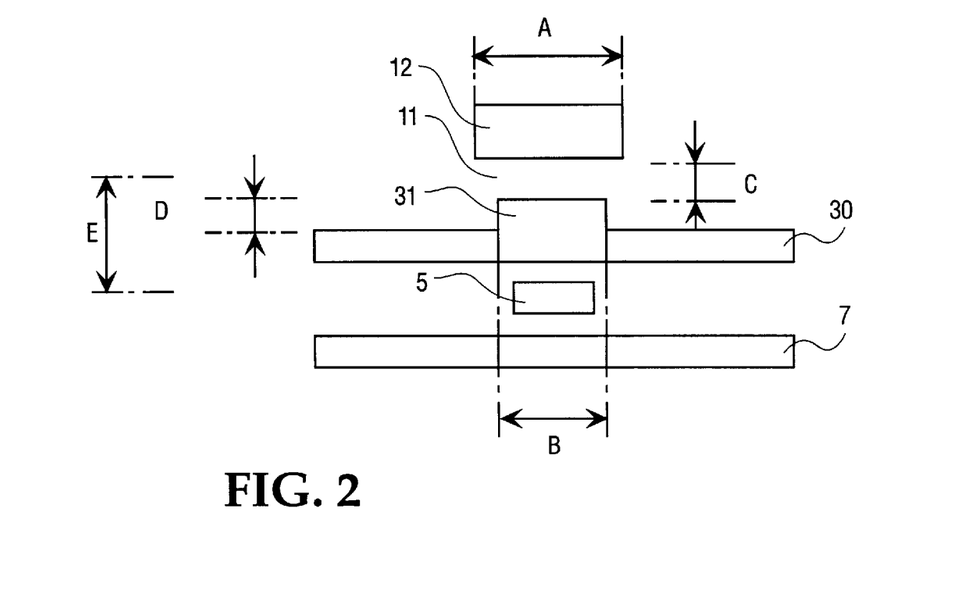
FIG. 2 is an explanatory diagram which illustrates the layer construction of the composite type thin-film magnetic head of this working configuration of the present invention in simplified form.
Figure 4:
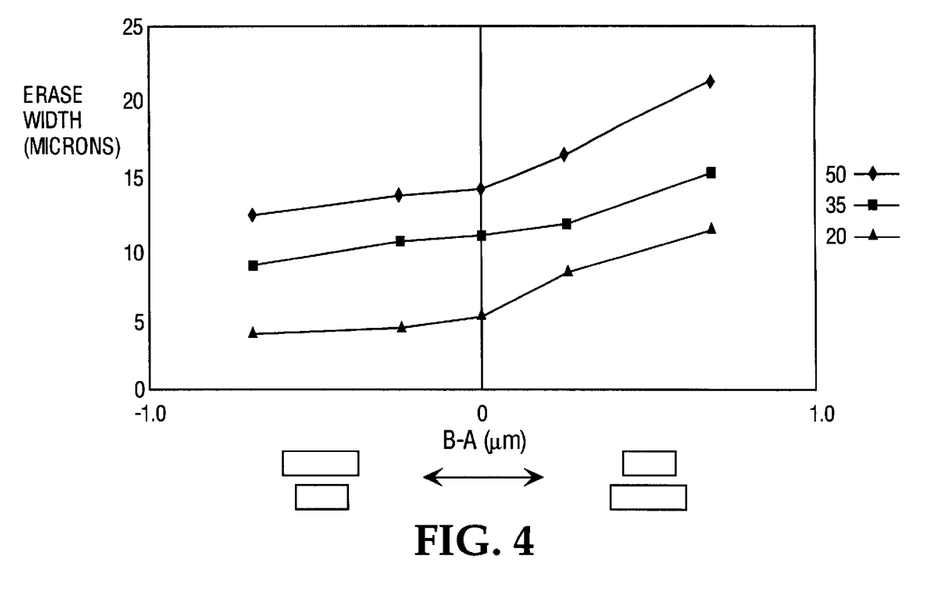
FIG. 4 is a graph which illustrates the relationship of the erase width and recording current to the difference in width between the projection of the second magnetic film layer and the third magnetic film layer.
Figure 5:
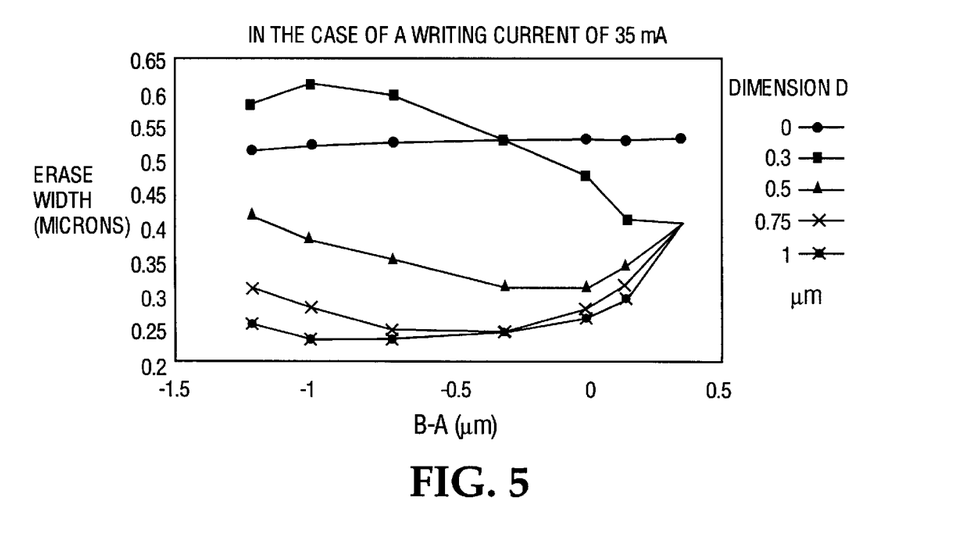
FIG. 5 is a graph which illustrates the relationship of the erase width and height of the projection of the second magnetic film layer to the difference in width between the projection of the second magnetic film layer and the third magnetic film layer.
Figure 6:
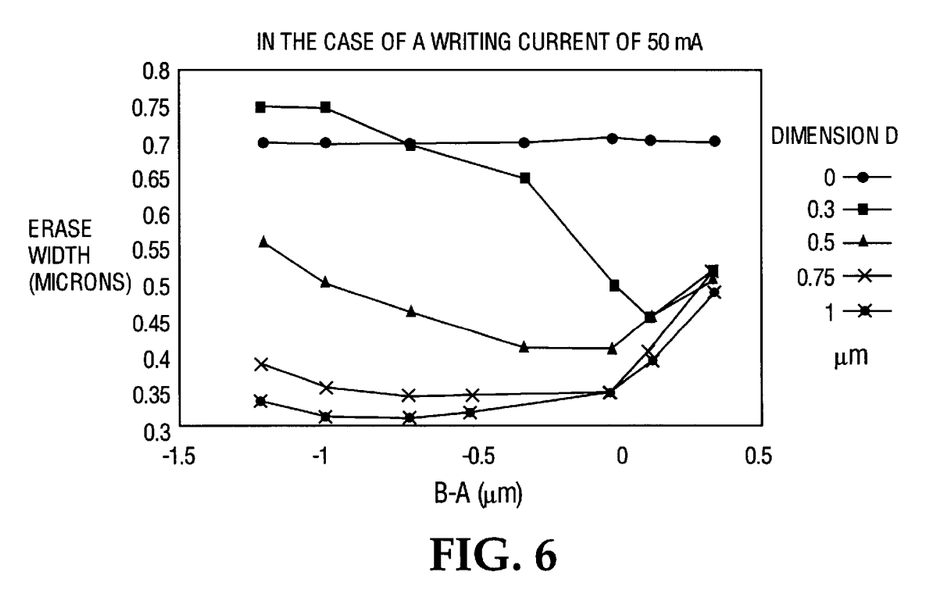
FIG. 6 is another graph which illustrates the relationship of the erase width and height of the projection of the second magnetic film layer to the difference in width between the projection of the second magnetic film layer and the third magnetic film layer.

FIG. 1 is a perspective view of the gap portion of a composite time thin-film magnetic head which constitutes a working configuration of the present invention. FIG. 2 is an explanatory diagram which illustrates the layer construction of the composite type thin-film magnetic head of this working configuration of the present invention in simplified form. FIGS. 3A–C are explanatory diagrams which show (in model form) the shape of the magnetic field above and below the gap of the thin-film magnetic head in a case where the width of the projection of the second magnetic film layer and the width of the third magnetic film layer differ. FIG. 4 is a graph which illustrates the relationship of the erase width and recording current to the difference in width between the projection of the second magnetic film layer and the third magnetic film layer. FIG. 5 is a graph which illustrates the relationship of the erase width and height of the projection of the second magnetic film layer to the difference in width between the projection of the second magnetic film layer and the third magnetic film layer. FIG. 6 is another graph which illustrates the relationship of the erase width and height of the projection of the second magnetic film layer to the difference in width between the projection of the second magnetic film layer and the third magnetic film layer. FIGS. 7, 8, 9 and 10 are explanatory diagrams which illustrate the layer constructions of composite type thin-film magnetic heads of other working configurations of the present invention in simplified form.

The composite type thin-film magnetic head of the present working configuration of the invention is the same as that shown in FIGS. 11 and 12 except for the second magnetic film layer 30.

The essential point of the composite type thin-film magnetic head of the present working configuration is that a step-form projection 31 is formed on the second magnetic film layer 30 as shown in FIGS. 1 and 2. The position in which the projection 31 is formed is the area where the aforementioned second magnetic film layer 30 faces the aforementioned third magnetic film layer 12 with the aforementioned gap film layer 11 interposed. Furthermore, the width b of this projection 31 is smaller than the width a of the third magnetic film layer 12.

It is desirable that the difference between the width b of the projection 31 of the second magnetic film layer 30 and the width a of the facing portion of the third magnetic film layer be in the range of 0.05 microns to 0.8 microns.

As was described above, in cases where the relationship between the width b of the projection 31 and the width a of the third magnetic film layer 12 is such that a<b, a transition region shape in which both edges rise is produced in the same manner as before. Furthermore, in cases where a=b, this rise is somewhat alleviated compared to that seen in cases where a<b; however, both edge portions still rise.

However, if the above-mentioned values are set so that a>b, and so that the difference between said values is in the above-mentioned range, the magnetic flux at both ends of the gap will emerge downward from the third magnetic film layer 12, so that the transition region shape is improved as shown in FIG. 3C.

The relationship of the erase width to the difference in width between the second magnetic film layer and third magnetic film layer is shown by the graph in FIG. 4. As is clear from this graph, the erase width is correlated with the width b of the projection 31 and the width a of the third magnetic film layer 12, and shows an abrupt increase when the width b of the projection 31 exceeds the width a of the third magnetic film layer 12. However, in cases where the width b of the projection 31 is conversely smaller than the width a of the third magnetic film layer 12, the erase width is stabilized.

For example, in cases where the height d of the projection is large, i. e., approximately 1 micron, the slope of the variation in the size of the erase width is abrupt in the area where the difference between the width b of the projection 31 and the width a of the third magnetic film layer 12 is "0" (i. e., in cases where both widths are equal). Accordingly, the effect of the present invention can be expected only in cases where the width b of the projection 31 is at least smaller than the width a of the third magnetic film layer 12. However, in cases where the frame of the third magnetic film layer is formed by photolithography, etc., the facing portions of the projection and the third magnetic film layer may be shifted as a result of the positioning precision of the exposure apparatus, etc., if the difference between the two is too small, so that one edge portion of the third magnetic film layer may in some cases be positioned to the inside of the edge portion of the projection 31. In such cases, the erase width on one side is large as described above. Accordingly, it is desirable that the difference between the width b of the projection 31 and the width a of the third magnetic film layer 12 be set at a value of at least about 0.05 microns.

Conversely, in cases where the difference between the two widths exceeds 0.8 microns, the bundling of the magnetic flux becomes insufficient; as a result, although the erase width is stable, the overall magnetic field strength drops, which is undesirable. Furthermore, as is clear from the graph shown in FIG. 5, the tendency of the erase width to stabilize in cases where the width b of the projection 31 is smaller than the width a of the third magnetic layer 12 is seen regardless of the strength of the recording current.

Furthermore, it is desirable that the height d of the projection 31 be in the range of 0.5 microns to 2 microns. Specifically, in a case where the recording current lw is fixed at 35 mA, the relationship of the erase width and the height d of the projection 31 of the second magnetic film layer 30 to the difference b−a between the width of the projection 31 of the second magnetic film layer 30 and the width of the third magnetic film layer 12 is as shown in the graph in FIG. 5. As is clear from this graph, the erase width is correlated with the height d of the projection 31, with the erase width showing greater stabilization as the height d of the projection 31 increases. Furthermore, the stability of the erase width is conspicuous in cases where the height d of the projection 31 is 0.5 microns or greater.

In the outer circumferential portions of a magnetic disk, the angle known as "skew"θ between the gap direction and the radial direction of the disk ordinarily becomes too large to ignore. In such cases, if the height d of the projection 31 exceeds 2 microns, the problem of an excessively large read-write offset arises. Accordingly, such a large height is undesirable.

If the recommended range of the above-mentioned projection height d is calculated on the basis of the relationship with the length c of the writing gap, we may say that it is desirable that the height d of the projection 31 be in the range of 1.4 times the length c of the writing gap or greater and preferably 5 times the length c of the writing gap or less. Furthermore, from the standpoint of the relationship with the read-write offset, it is desirable that the height d of the projection be set so that the distance e between the centers of the writing gap and reading gap is 3 microns or less. Moreover, calculating this in terms of the relationship with the length c of the writing gap, it is desirable that the distance e between the center of the writing gap and the center of the reading gap be 9 times the length c of the writing gap or less.

FIG. 5 shows the results obtained when a similar experiment was performed with the recording current lw fixed at 50 mA. It is seen that the tendency is the same as in the case where the recording current lw was fixed at 35 mA.

Figure 7:
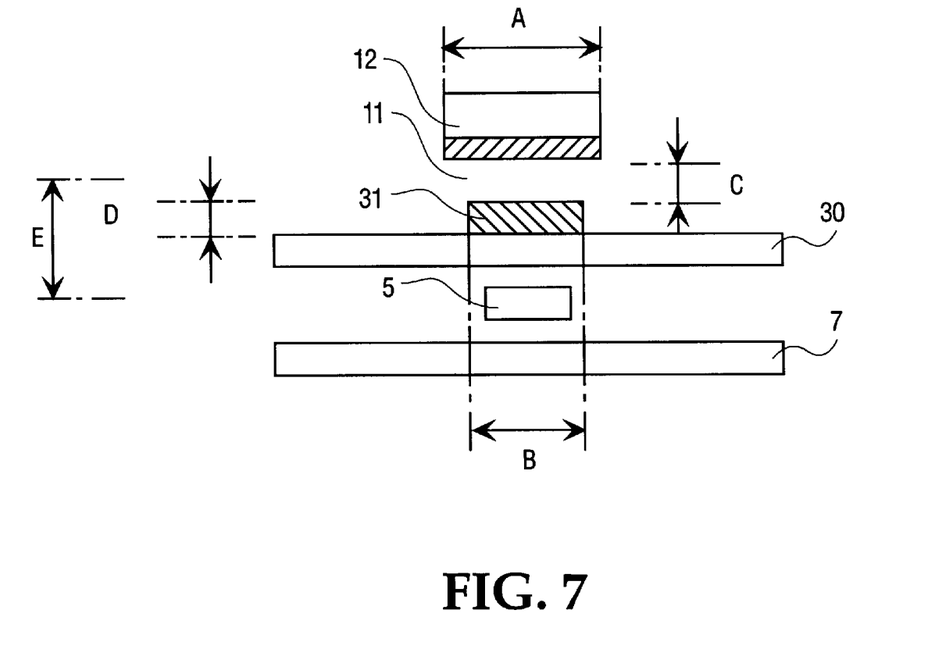
FIG. 7 is an explanatory diagram which illustrates the layer constructions of a composite type thin-film magnetic head of another working configuration of the present invention in simplified form.
Figure 8:
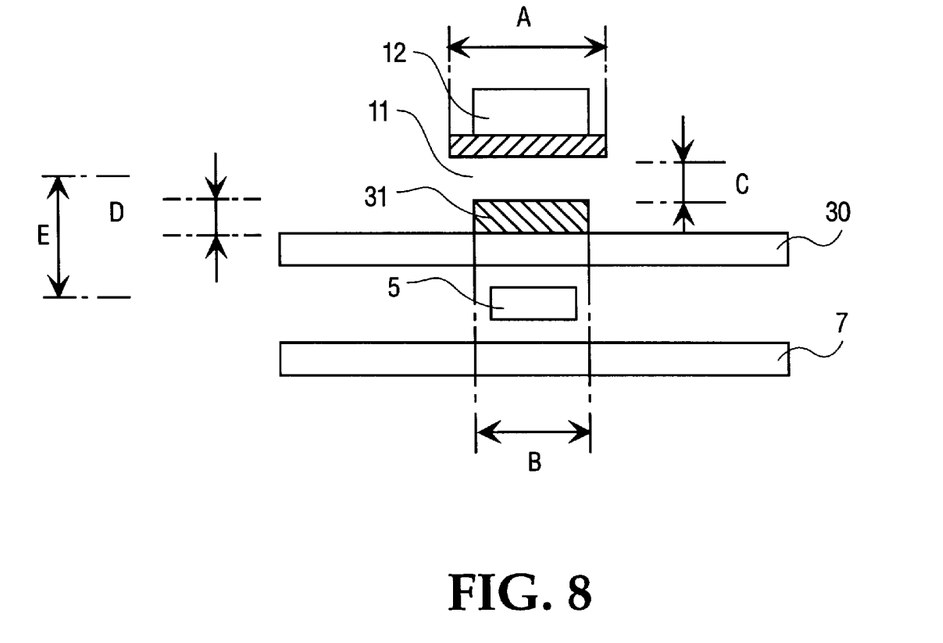
FIG. 8 is an explanatory diagram which illustrates the layer constructions of a composite type thin-film magnetic head of another working configuration of the present invention in simplified form.

Furthermore, in cases where the relationship between the gap-facing widths of the projection 31 of the second magnetic film layer 30 and the third magnetic film layer 12 satisfies the above-mentioned conditions, as shown in FIG. 7, the effect of the present invention is manifested even if the width of the third magnetic film layer 12 at higher positions than the gap-facing portion of the third magnetic film layer 12 is smaller.

Universally known permalloy is used as the material of the second magnetic film layer 30 and third magnetic film layer 12. However, it is recommended that a magnetic material with an especially high saturation flux density be used locally in the portions facing the gap. In concrete terms, it is recommended that a magnetic material with an especially high saturation flux density be used in the portions indicated by hatching in FIG. 8, i. e., the projection 31 of the second magnetic film layer 30 and the gap-side portion of the third magnetic film layer 12. Furthermore, by doing this, it is possible to suppress an increase in the erase width caused by saturation in cases where the recording magnetic field is increased.

Furthermore, in the composite type thin-film head of the present working configuration, most of the second magnetic film layer 30 is flat, with the aforementioned projection 31 being formed only in the area where the magnetic gap is formed. Accordingly, the second magnetic film layer 30 can also function adequately as a magnetic shield.

Specifically, in composite type thin-film magnetic heads, the second magnetic film layer 30 functions not only as one core of the inductive head used for recording, but also as a magnetic shield on the side of the magneto-resistive head used for playback. Furthermore, in most horizontal type MR heads, there are many parts besides the magnetism-sensing part of the MR element which require shielding, such as the hard film used to alleviate the instability of the MR film and element, etc. Accordingly, a magnetic shielding function is also required in the second magnetic film layer 30. In response to this requirement, the composite type thin-film magnetic head of the present working configuration is constructed so that the area of the second magnetic film layer 30 is broad, and thus functions adequately as a magnetic shield.

Figure 9:
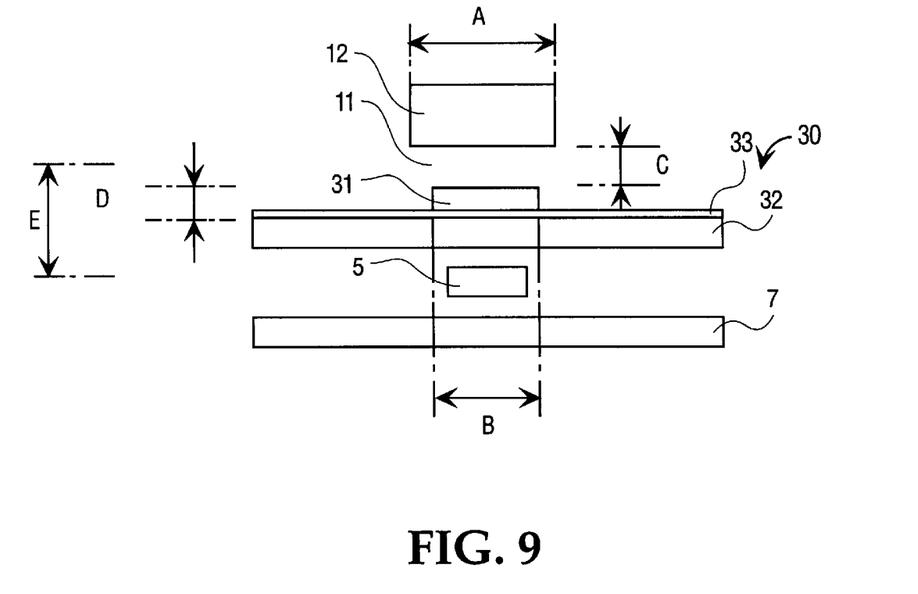
FIG. 9 is an explanatory diagram which illustrates the layer constructions of a composite type thin-film magnetic head of another working configuration of the present invention in simplified form.

In the working configuration described above, the projection 31 was formed directly on the second magnetic film layer 30. However, it would also be possible to interpose a non-magnetic film layer between the projection 31 and the second magnetic film layer 30. FIG. 9 shows an example of this. Here, the second magnetic film layer 30 is formed by laminating a main-body magnetic film layer 32, a non-magnetic film layer 33 and a projection part layer. The projection 31 is formed on the main body magnetic film layer 32 with the non-magnetic film layer 33 interposed.

Furthermore, in cases where a second magnetic film layer 30 with an interposed non-magnetic film layer 33 such as that shown in FIG. 9 is used, the construction is designed so that the height d of the projection satisfies the aforementioned conditions (with the height including the nonmagnetic film layer 33 being considered as shown in FIG. 9).

Figure 10:
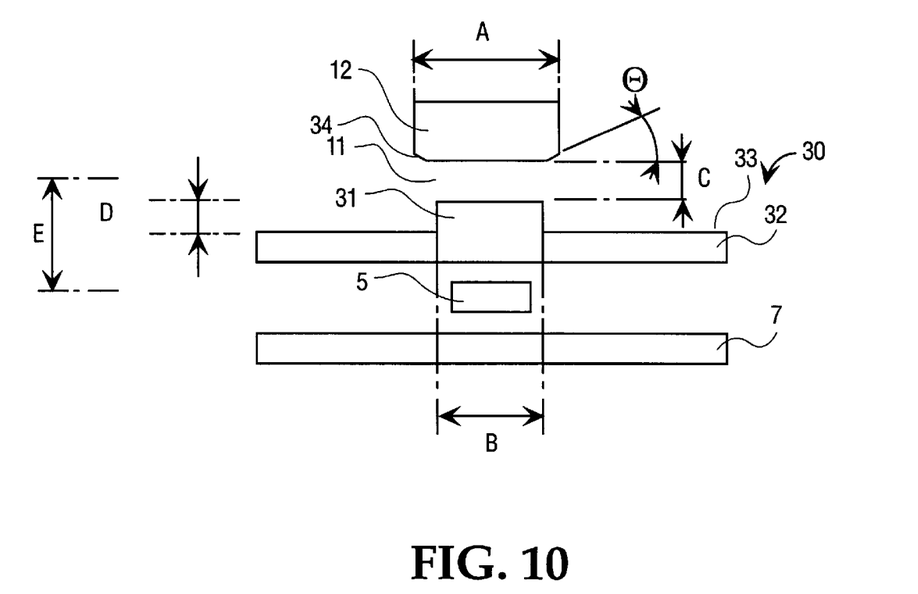
FIG. 10 is an explanatory diagram which illustrates the layer constructions of a composite type thin-film magnetic head of another working configuration of the present invention in simplified form.

Furthermore, in the working configuration described above, the corners of the third magnetic film layer 12 were all right-angled corners. However, it would also be possible to form an inclination in the edge portions as shown in FIG. 10. It is recommended that the angle of this inclination be 30° or less. In cases where the angle of this inclination exceeds 30°, both edge portions of the magnetization transition regions tend to rise.

The manufacture of the composite type thin-film magnetic head of the present invention is accomplished by applying universally known thin film forming techniques. Furthermore, after the height of the second magnetic film layer is aligned with the adjacent insulating layer portions consisting of alumina, etc., and the gap layer is formed in this area, the aforementioned third magnetic film layer 12 is formed. During the formation of the third magnetic film layer 12 here, there is a possibility that the lower end of the third magnetic film layer 12 and the upper end of the projection 31 may be shifted due to the alignment precision of the exposure apparatus, etc. Accordingly, it is desirable that the width a of the third magnetic film layer 12 be greater than the width b of the projection 31 by 0.05 microns or more.

In sum, the composite type thin-film magnetic head of the present invention makes it possible to reduce the erase width and improve the shape of the magnetization transition regions, so that a high recording density can be realized.

Furthermore, the composite type thin-film magnetic head of the present invention also has the effect of reducing the portions where the magnetization is non-uniform at the edges of the track width, which are formed when a signal is recorded on a magnetic disk. Accordingly, a high track pitch density can be realized. Furthermore, in the composite type thin-film magnetic head of the present invention, a sufficient width can be maintained in the second magnetic film layer, so that the second magnetic film layer can function satisfactorily as a shielding film. Accordingly, the head construction of the present invention can be applied to a broad range of MR head elements of both the vertical and horizontal types.

What is claimed is:

1. A composite type thin-film magnetic head, comprising:
   a first magnetic film layer, a second magnetic film layer having a major surface, and a third magnetic film layer;
   a magneto-resistive element interposed between the first magnetic film layer and the second magnetic film layer such that a magneto-resistive head used for playback is constructed, wherein end portions of the second magnetic film layer and third magnetic film layer face each other across a gap film layer such that an inductive head used for recording is constructed;
   a step-form projection formed in a portion of the second magnetic film layer that faces the third magnetic film layer, wherein a width of a facing portion of the projection is smaller than a width of a facing portion of the third magnetic film layer, the facing portion of the third magnetic film layer defining a boundary of the gap film layer, the step-form projection rising above the major surface of the second magnetic film layer; and
   the magneto-resistive head having a read gap, the read gap having a center, the composite type thin-film magnetic head having a writing gap, the writing gap having a center and a length, a distance between the center of the read gap and the center of the writing gap being less than 9 times the length of the writing gap.

2. The composite type thin-film magnetic head of claim 1, wherein a height of the projection is 1.4 to 5 times the length of the writing gap of the composite type thin-film magnetic head.

3. The composite type thin-film magnetic head of claim 1, wherein a height of the projection is 0.5 to 2 microns.

4. The composite type thin-film magnetic head of claim 1, wherein a difference between a width of the projection on the second magnetic film layer and the width of the facing portion of the third magnetic film layer is 0.05 microns or greater.

5. The composite type thin-film magnetic head of claim 1, wherein a difference between a width of the projection on the second magnetic film layer and the width of the facing portion of the third magnetic film layer is 0.05 microns to 0.8 microns.

6. The composite type thin-film magnetic head of claim 1, wherein a difference between a width of the projection on the second magnetic film layer and the width of the facing portion of the third magnetic film layer is 0.2 microns to 0.8 microns.

7. The composite type thin-film magnetic head of claim 1, wherein the second magnetic film layer is formed by laminating a main body magnetic film layer, a non-magnetic film layer and a projection part layer, the projection part layer disposed on the main body magnetic film layer, the non-magnetic film layer interposed between the projection part layer and the main body magnetic film layer.

8. The composite type thin-film magnetic head claim 1, wherein an inclined portion having an angle of 30° or less is formed on a corner portion of a portion of the third magnetic film layer that faces the second magnetic film layer.

* * * * *